(12) United States Patent
Heilig et al.

(10) Patent No.: US 7,398,854 B2
(45) Date of Patent: Jul. 15, 2008

(54) METHOD FOR CONTROLLING AN ELECTRIC POWER STEERING SYSTEM

(75) Inventors: Arnulf Heilig, Schwaebisch Gmuend (DE); Michael Bischofberger, Schwaebisch Gmuend (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 644 days.

(21) Appl. No.: 11/100,919

(22) Filed: Apr. 6, 2005

(65) Prior Publication Data
US 2006/0000662 A1    Jan. 5, 2006

(30) Foreign Application Priority Data
May 6, 2004    (DE) .................. 10 2004 022 450

(51) Int. Cl.
*B62D 5/04* (2006.01)
*B62D 6/00* (2006.01)

(52) U.S. Cl. .................. 180/446; 701/41; 701/42

(58) Field of Classification Search .............. 180/446; 701/41, 42
See application file for complete search history.

(56) References Cited

U.S. PATENT DOCUMENTS

| | | | |
|---|---|---|---|
| 4,665,489 A * | 5/1987 | Suzuki et al. ............. 701/24 |
| 6,223,107 B1 * | 4/2001 | Mergenthaler et al. ........ 701/34 |
| 6,364,051 B1 * | 4/2002 | Kada et al. .................. 180/446 |
| 6,382,345 B2 * | 5/2002 | Kada et al. .................. 180/446 |
| 6,425,454 B1 | 7/2002 | Chabaan et al. |
| 6,789,017 B2 * | 9/2004 | Aanen et al. ................. 701/41 |
| 6,816,799 B2 * | 11/2004 | Yu et al. ...................... 702/94 |
| 6,895,357 B2 * | 5/2005 | Lou et al. .................... 702/151 |

FOREIGN PATENT DOCUMENTS

JP    2003112648 A  *  4/2003

* cited by examiner

*Primary Examiner*—Lesley D. Morris
*Assistant Examiner*—Daniel Yeagley
(74) *Attorney, Agent, or Firm*—Jordan and Hamburg LLP

(57) ABSTRACT

A method for controlling an electrical power steering system for a vehicle includes an electrical servomotor, a steering device for entering a reference value ($\theta_S$) of a steering angle into a control and/or regulation device, a moment sensor and an angle sensor for the steering device, a device for estimating the moment ($M_v$) at the steering device and an angle sensor for determining the angle ($\theta_A$) of a power take-off of the electrical servomotor. In order to control the electrical power steering system, which makes a non-critical behavior possible in the event of a malfunction or failure of a moment sensor at the steering device, provisions are made so that an offset value ($\Delta_\theta$) is constantly formed from the reference value ($\delta_S$) of the steering angle and the actual value $\theta_I$ of the steering angle, and a virtual moment ($M_v$) of the steering device is determined on the basis of the offset value ($\Delta_\theta$) and is used to control the electrical servomotor.

13 Claims, 1 Drawing Sheet

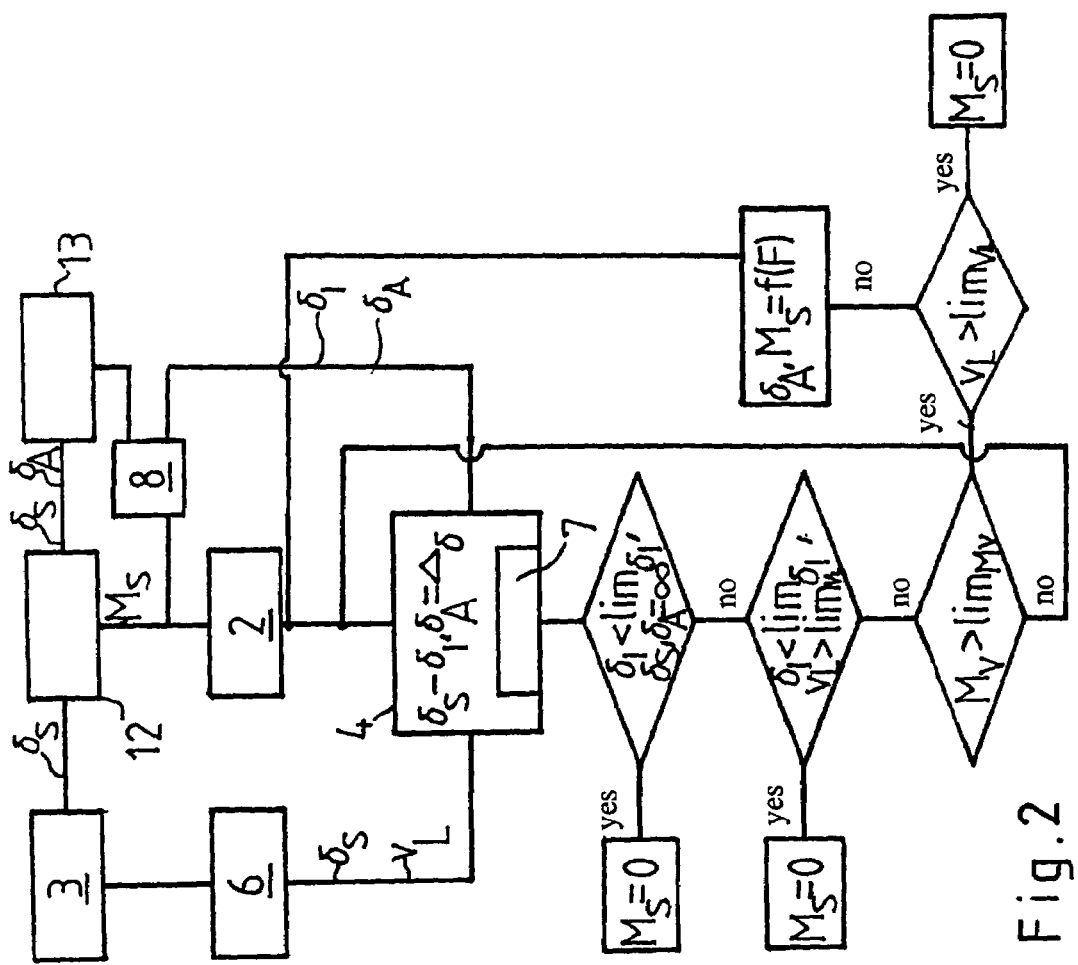
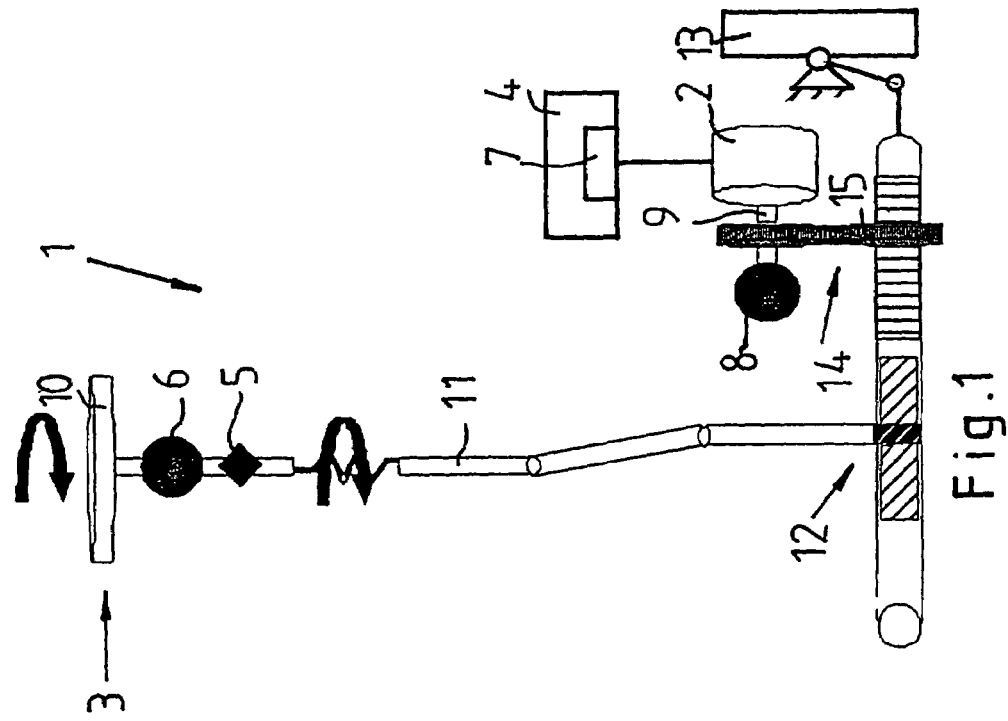
Fig.2
Fig.1

METHOD FOR CONTROLLING AN ELECTRIC POWER STEERING SYSTEM

BACKGROUND OF THE INVENTION

The invention relates to a method for controlling an electrical power steering system and to an electrical power steering system for implementing the method.

U.S. Pat. No. 6,425,454 B1 describes an electrical power steering system and a method for operating the electrical power steering system, in which the steering moment applied by a driver of a vehicle to a steering handle to change the steering angle adjustment of one or more steered wheels of the vehicle is transferred by way of a steering shaft. To support the steering force of the driver, an electrical servomotor is provided, in which a motor-regulating moment is generated at the steering handle, as a function of the steering angle reference value and a steering moment entered in a control and/or regulation device at the steering handle,. The motor-regulating moment is transferred to the steering shaft and to the steered wheel or the steered wheel or wheels by way of a power take-off. The electrical power steering has a sensor mechanism, consisting of an angle sensor and a moment sensor at the steering handle, and, among other things, an angle sensor to measure the angle of rotation of the power take-off of the electrical servomotor. A torque sensor to measure the torque at the power take-off of the electrical servomotor is not necessary, since the electrical power steering system has a device for estimating the moment at the steering handle and for estimating the moment at the power take-off of the electrical servomotor.

Using the sensor signals, such an electrical power steering can be controlled as a function of the construction of the electrical servomotor, for example by way of a field-oriented control system, the angle of rotation of the power take-off of the electrical servomotor being detected by the sensors, as a function of the movement of the steering handle and supplied to the control and/or regulation device, and the servomotor being controlled by way of the current frequency or the electrical power supplied, actual travel and vehicle parameters preferably being taken into consideration.

If an error or a failure occurs at the moment sensor at the steering handle with such electrical power steering mechanisms, the electrical servomotor is switched off; depending on the driving situation in each instance, this can result in a great increase in the moment to be applied by the driver at the steering handle, and can result in irritation of the driver.

SUMMARY OF THE INVENTION

It is an object of the invention to create a method for controlling an electrical power steering system and an electrical power steering system, the behavior of which in the event of a malfunction or failure of a moment sensor at the steering handle is not critical.

Owing to the fact that a difference or offset from the steering angle reference value input at the steering handle and an actual steering angle value of the steered wheels of the vehicle is determined constantly during the operation of the electrical power steering system, particularly by the control and/or regulation device, and a virtual moment of the steering handle is determined on the basis of the offset value as a replacement for the measured moment at the steering handle, an actual virtual moment of the steering handle is always available in case of failure or malfunction of the moment sensor at the steering handle and can be used to control the electrical servomotor. With that, even after a failure of the moment sensor at the steering handle, operation of the electrical power steering is possible, at least for a certain time, without having to switch off the electrical servomotor completely and without causing irritation to the driver.

In a particularly preferred embodiment of the method for controlling the electrical power steering, the virtual moment of the steering handle is determined by the control and/or regulation device from the actual value of the steering angle, from the angle of rotation of the power take-off of the electrical servomotor, from the offset value and from the stiffness of the kinematics of the electrical power steering and the electric servomotor is controlled. In this connection, the moment of the electrical servomotor is preferably reduced, step by step, in the case of an error of the moment sensor at the steering handle, by way of a stored transition function, such as a ramp function, for example.

It may also be appropriate to provide the transition function as a strictly monotonously decreasing function with the same or a different gradient.

Preferably, the moment of the electrical servomotor is reduced by the control and/or regulation device by way of a transition function, if the virtual moment of the steering handle decreases by a specifiable limiting value of, for example, 2 Nm.

However, if the sense of direction of the virtual moment of the steering handle changes suddenly and if the amount of the change in the virtual moment exceeds a certain limiting value, which can be specified, the electrical servomotor is switched off preferably by the control and/or regulation device. The electrical servomotor is also switched off if an offset value cannot be determined, because of an error of an angle sensor at the steering handle or at the power take-off of the electrical servomotor and if the actual value of the steering angle is relatively small in the respective driving situation and does not exceed a specifiable limiting value.

It is justifiable to switch the electrical servomotor off for safety reasons, if the actual value of the steering angle is less than a specifiable limiting value and an error occurs at the angle sensor at the steering handle or an error occurs at the moment sensor at the steering handle. In this connection, a limiting value of the actual value of the steering angle may be approximately 10 degrees. The electrical servomotor can also be switched off by the control and/or regulation device in combination with the stated criteria or exclusively when the steering velocity exceeds a specifiable, limiting value, such as 100°/sec, for example. The method for controlling the electrical power steering is suitable for electrical power steering mechanisms of passenger cars or trucks, in the same manner.

The invention will now be explained in greater detail by means of an example and the accompanying drawing.

BRIEF DESCRIPTION OF THE DRAWINGS

FIG. 1 shows a diagrammatic view of an electrical power steering, and

FIG. 2 shows a block circuit diagram of the method for controlling the electrical power steering in the event of a failure of the moment sensor at the steering handle.

DESCRIPTION OF THE PREFERRED EMBODIMENTS

FIG. 1 shows a diagrammatic view of an electrical power steering system 1, the steering handle 3 of which, configured as a steering wheel 10, is mechanically connected with steerable wheels 13 of a vehicle, to adjust their steering angle, by way of a steering shaft 11 and a rack and pinion steering gear mechanism 12. A power take-off 9 of an electrical servomotor 2, the speed of rotation and moment $M_S$ of which is controlled by a control and/or regulation device 4, transfers its torque to a rack 15 of the rack and pinion steering gear mechanism 12, by way of a toothed belt gear mechanism 14. For this purpose, the rack 15, together with a steering nut 16, forms a movement screw for axial displacement of the rack 15. The control and/or regulation device 4 processes sensor signals of an angle sensor 6 and of a moment sensor 5 at the steering handle 3, as well as of an angle sensor 8 at the power take-off 9 of the electrical servomotor 2.

The angle sensor 2 at the steering handle 3 supplies a steering angle reference value $\delta_S$ as well as a steering velocity value $v_L$. The nature of the control signal at the electrical servomotor 2 may be different, such as a variable voltage signal or a frequency-modulated current signal, and can be derived from a characteristic field.

When the electrical power steering 1 is operating, the control and/or regulation device 4 forms an offset value $\Delta_\delta$ from the reference value $\delta_S$ of the steering angle and an actual value $\delta_I$ steering angle, which can also be represented by the angle sensor 8 at the power take-off 9 of the electrical servomotor 2 as an angle $\delta_A$ of the power take-off 9. By means of the constantly determined offset value $\Delta_\delta$, a virtual moment $M_v$, which approximates the moment measured by the moment sensor 5 at the steering handle, may be determined by a device 7 for estimating the moment at the steering handle 3. In case of a malfunction or failure of the moment sensor 5 at the steering handle 3, the virtual moment $M_v$ is utilized to control the electrical servomotor 2 by the control and/or regulation device.

If a limiting value for the virtual moment $M_v$ or its derivative is exceeded, the control measures for the electrical servomotor 2 and for its moment $M_S$ and angle of rotation $\delta_A$ of its power take-off, shown in FIG. 2 are taken.

FIG. 2 is a block circuit diagram of a method for controlling the electrical servomotor 2 in FIG. 1; it is used if the moment sensor 5 at the steering handle 3 fails. The reference value $\delta_S$ of the steering angle, entered at the steering handle 3, is transferred mechanically to a steerable wheel 13 by way of the steering gear mechanism 12, which comprises the rack 15. The electrical servomotor 2 acts on the steering gear mechanism 12 with its power take-off, and makes a moment $M_S$ and an angle of rotation $\delta_A$ available.

The angle sensor 6 at the steering handle 3 detects the reference value $\delta_S$ of the steering angle and the steering velocity $v_L$ at the steering handle 3, which are supplied to the control and/or regulation device 4 on the input side. In the block circuit diagram, a moment signal is not provided at the steering handle 3, since the function of the electrical power steering 1 is shown in the case of failure of the moment sensor 5 (see FIG. 1). An angle sensor 8 detects the angle $\delta_A$ at the power take-off 9 and/or the steering angle actual value $\delta_I$ at the power take-off 9 of the electrical servomotor 2 or at the steered wheel 13.

As a replacement for the absent moment signal of the moment at the steering handle 3, the device 7 calculates a virtual moment $M_v$ to estimate the moment at the steering handle 3 of the control and/or regulation device 4. For this purpose, an offset value $\Delta_\delta$ is formed from the difference between the reference value $\delta_S$ of the steering angle and the actual value $\delta_I$ of the steering angle or, instead of the actual value of the steering angle, by the angle $\delta_A$ of the power take-off 9 of the electrical servomotor 2. The stiffness of the system as a whole is taken into consideration in this connection. The virtual moment $M_v$ serves to control the electrical servomotor 2. In this connection, the control and/or regulation device 4 checks whether the virtual moment $M_v$ has been reduced by a specifiable limiting value $\lim_{M_v}$, which may amount to 2 Nm in the example, or more and whether the steering velocity $v_L$ exceeds a limiting value $\lim_{v_L}$. The control and/or regulation device 4 reduces the moment support of the electrical servomotor 2 by way of a transition function F, if the virtual moment $M_v$ exceeds the specifiable limiting value $\lim_{M_v}$, but the steering velocity $v_L$ does not exceed the specifiable limiting value $\lim_{v_L}$. The transition function F preferably is a ramp function. In a particularly preferred embodiment of the method for controlling the electrical power steering 1, the moment $M_S$ of the servomotor 2 is additionally reduced by about 30%, when the transition function F is used. This is perceived by the driver of the vehicle not as an irritant, but definitely as an indication of a change in the power support. If the steering velocity VL exceeds the limiting value $\lim_{v_L}$ of 100°/s, for example, the control and/or regulation device 4 switches the electrical servomotor 2 off, so that its moment $M_S$ becomes 0 Nm. The electrical servomotor 2 is also switched off if an angle sensor 6, 8 does not supply plausible signals or any signals at all, as becomes clear when $\delta S$, $\delta A = \infty$, provided that the actual value $\delta$ of the steering angle does not exceed a non-critical limiting value $\lim_{\delta_I}$ of 10°, for example.

LIST OF REFERENCE SYMBOLS

| | |
|---|---|
| 1 | electrical power steering |
| 2 | servomotor, electrical |
| 3 | steering handle |
| 4 | control and/or regulation device |
| 5 | moment sensor, at 3 |
| 6 | angle sensor, at 3 |
| 7 | device for estimating a moment |
| 8 | angle sensor, at 2 |
| 9 | power take-off |
| 10 | steering wheel |
| 11 | steering shaft |
| 12 | steering gear mechanism |
| 13 | wheel |
| 14 | rack and pinion gear mechanism |
| 15 | steering nut |
| 16 | |
| 17 | |
| 18 | |
| 19 | |
| 20 | |
| 21 | |
| 22 | |
| 23 | |
| 24 | |
| $\delta_S$ | reference value of steering angle |
| $\delta_I$ | actual value of steering angle |
| $\Delta_\delta$ | offset value |
| $M_v$ | moment, virtual |
| $\delta_A$ | angle, at 9 |
| 26 | |
| 27 | |
| 28 | |
| 29 | |
| 30 | |
| 31 | |
| 32 | |
| 33 | |
| 34 | |
| 35 | |
| 36 | |
| 37 | |
| 38 | |
| 39 | |
| 40 | |
| 41 | |
| 42 | |
| 43 | |

LIST OF REFERENCE SYMBOLS

| | |
|---|---|
| 44 | |
| 45 | |
| 46 | |
| 47 | |
| 48 | |
| 49 | |
| $\lim_{Mv}$ | limiting value, of moment, virtual |
| $\lim_{\delta1}$ | limiting value, of actual value of steering angle |
| $M_S$ | moment, of 2 |
| $v_L$ | steering velocity |
| $\lim_{vL}$ | limiting value, of steering velocity |
| F | transition function |

The invention claimed is:

1. Method for controlling an electrical power steering for a vehicle comprising an electrical servomotor, having a power take-off, a control and/or regulation device, a steering device for entering a reference value ($\theta_S$) of a steering angle into the control and/or regulation device, a moment sensor and a first angle sensor for the steering device, an estimating device for estimating the moment ($M_v$) at the steering device, a second angle sensor for determining the angle ($\theta_A$) of the power take-off of the electrical servomotor, an offset value ($\Delta_\theta$) being determined constantly from the reference value ($\delta_S$) of the steering angle and an actual value ($\theta_I$) of the steering angle and a virtual moment ($M_v$) of the steering device being determined on the basis of the offset value ($\Delta_\theta$).

2. The method of claim 1, wherein the virtual moment ($M_v$) of the steering device is determined by the control and/or regulation device from the steering angle actual value ($\theta_I$), the angle ($\theta_A$) of the power take-off of the electrical servomotor, the offset value ($\Delta_\theta$), and the stiffness of the kinematics of the electrical power steering.

3. The method of claim 1, wherein in the event of a malfunction or a failure of the moment sensor of the steering device, a moment ($M_S$) of the electrical servomotor is reduced by the control and/or regulation device by way of a transition function (F), as a function of the virtual moment ($M_v$) of the steering device, the actual value ($\theta_I$) of the steering angle and a steering velocity ($v_L$) specified by the steering device.

4. The method of claim 3, wherein the transition function (F) is a ramp function.

5. The method of claim 3, wherein the transition function (F) is a strictly monotonously decreasing function.

6. The method of claim 3, wherein the moment ($M_S$) of the electrical servomotor is reduced by the control and/or regulation device by way of the transition function (F), if the virtual moment ($M_v$) of the steering device has decreased to a specifiable limiting value ($\lim_{Mv}$).

7. The method of claim 6, wherein the limiting value ($\lim_{Mv}$) of the virtual moment ($M_v$) at the steering device is approximately 2 Nm.

8. The method of claim 6, wherein the electrical servomotor is switched off by the control and/or regulation device when the virtual moment ($M_v$) of the steering device has changed its sense of direction, while simultaneously exceeding the specifiable limiting value ($\lim_{Mv}$).

9. The method of claim 1, wherein the electrical servomotor is switched off by the control and/or regulation device when an error at the first or second angle sensors is detected by the control and/or regulation device.

10. The method of claim 1, wherein the electrical servomotor is switched off by the control and/or regulation device when the steering angle actual value ($\delta_I$) is less than a specifiable limiting value ($\lim_{\delta I}$) and an error occurs at the first angle sensor for the steering device or an error occurs at the moment sensor at the steering device.

11. The method of claim 10, wherein the limiting value ($\lim_{\delta I}$) is approximately 10°.

12. The method of claim 1, wherein the electric servomotor is switched off by the control and/or regulating device when the steering speed ($V_L$) exceeds a specifiable limiting value ($\lim_{vL}$).

13. The method of claim 12, wherein the specifiable limiting value ($\lim_{vL}$) is approximately 100°/s.

* * * * *